United States Patent [19]

Kato et al.

[11] Patent Number: 4,858,646
[45] Date of Patent: Aug. 22, 1989

[54] HYDRAULIC PRESSURE CONTROL DEVICE FOR CLUTCH FOR CONTROLLING DRIVE TORQUE DISTRIBUTION IN FOUR WHEEL DRIVE DEVICE

[75] Inventors: Nobuyuki Kato, Toyota; Koujiro Kuramochi, Okazaki; Shinya Nakamura, Owariasahi; Yasuo Houjo, Nagoya, all of Japan

[73] Assignee: Toyota Jidosha Kabushiki Kaisha, Aichi, Japan

[21] Appl. No.: 280,824

[22] Filed: Dec. 7, 1988

[30] Foreign Application Priority Data

Jan. 28, 1988 [JP] Japan ................................. 63-18424

[51] Int. Cl.[4] ........................................... F15B 13/043
[52] U.S. Cl. ................................. 137/596.16; 91/32; 192/85 R
[58] Field of Search ...................... 91/32; 137/596.16; 192/85 R

[56] References Cited

U.S. PATENT DOCUMENTS 3,823,621  7/1974  Kubo et al. ............... 137/596.16 X Primary Examiner—Gerald A. Michalsky
Attorney, Agent, or Firm—Oliff & Berridge

[57] ABSTRACT

The hydraulic pressure for operating the two wheel drive/four wheel drive switchover clutch in the part-time type four wheel drive device or the central differential lock-up clutch in the full-time type four wheel drive device is produced by a combination of a pressure regulation valve and two switchover valves to be selectable among several substantially different pressure levels so that the four wheel drive device can be quickly switched over between the complete four wheel operation and the complete two wheel operation, including one or more intermediate half clutched incomplete four wheel operation.

5 Claims, 6 Drawing Sheets

HYDRAULIC PRESSURE CONTROL DEVICE FOR CLUTCH FOR CONTROLLING DRIVE TORQUE DISTRIBUTION IN FOUR WHEEL DRIVE DEVICE

BACKGROUND OF THE INVENTION

1. Field of the Invention

The present invention relates to a hydraulic pressure control device for a drive torque distribution clutch, such as a two wheel drive/four wheel drive switchover clutch or a center differential lockup clutch, which controls drive torque distribution in a four wheel drive device in a vehicle such as an automobile.

2. Description of the Prior Art

The four wheel drive device mounted in a vehicle such as an automobile is known in the form of the so-called part-time type and the so-called full-time type, and in either type it incorporates a clutch for controlling drive torque distribution in the four wheel drive device. In the part-time type four wheel drive device, either a front wheel drive member or a rear wheel drive member is directly connected with a drive member adapted to be driven by an engine, and a switchover clutch selectively couples the other of the front wheel drive member and the rear wheel drive member to the drive member driven by the engine, so as thereby to effect switching over between the two wheel drive state and the four wheel drive state. The full-time type four wheel drive device has a center differential device for differentiatingly driving a front wheel drive member and a rear wheel drive member from an engine, and a center differential lock-up clutch which selectively locks up the differential operation of the center differentiating device so as thereby to effect switching over between a front/rear differential drive state and a positive four wheel drive state.

Such a switchover clutch or central differential lock-up clutch as described above is generally not to operate only in a completely engaged state or a completely disengaged state but continually controls the amount of drive torque transmitted therethrough so that continually variable intermediate drive states are available between the four wheel drive state and the two wheel drive state or between the complete four wheel differential drive state and the four wheel positive drive state.

Various proposals have already been made to control the torque transmission capacity or the engagement state of such a clutch according to various control parameters. Among such prior proposals are Japanese Patent Laying-open Publication 60-176827 (1985), Japanese Utility Model Laying-open Publication 61-101034 (1986), and Japanese Patent Laying-open Publication 62-139772 (1987).

In such four wheel drive devices the clutch for controlling torque distribution is generally of a hydraulic control type in which the transmission torque is variably set according to the hydraulic pressure supplied thereto, and the torque transmission capacity of the torque distribution control clutch is controlled by a control of the duty ratio of a hydraulic pressure supplied to said clutch by employing an electric control means.

Based upon such a duty ratio control the hydraulic pressure will be controlled continuously, and the torque transmission capacity of the torque distribution control clutch will be continuously controlled. Therefore, such a control system will be able to provide fine control.

However, such a duty ratio control is relatively slow in its response to an abrupt change in the hydraulic pressure required, and therefore it is difficult to obtain a quick switching over of the four wheel drive device between the four wheel drive state and the two wheel drive state or between the four wheel differentiating drive state and the four wheel positive drive state.

Further, when the vehicle is driven for a long time in the four wheel positive drive state, there is a danger that the engine is overloaded by the tight corner braking at curved running and the durability of the drive torque distribution clutch is thereby damaged. Therefore, it is desirable that the drive torque distribution clutch in the four wheel drive device is loosened or completely released when any trouble has occurred in the control system for the clutch.

SUMMARY OF THE INVENTION

The object of the present invention is to provide a hydraulic control device for the clutch for controlling drive torque distribution, like the above-mentioned two wheel drive/four wheel drive switchover clutch or center differential lock-up clutch, in a four wheel drive device, by which the hydraulic pressure to be supplied to the drive torque distribution control clutch is changed as a selection of hydraulic pressure from a number of different levels of hydraulic pressure, so that the torque distribution control clutch can be switched over among a required number of control states with high speed response performance.

The above-mentioned object is accomplished according to the present invention by a hydraulic pressure control device for a clutch for controlling drive torque distribution in a four wheel drive device, said clutch varying torque transmission capacity thereof according to a hydraulic pressure supplied thereto so as thereby to vary the drive torque distribution in the four wheel drive device, comprising: pressure regulation valve having at least one boost pressure port and producing a modulated hydraulic pressure from a line hydraulic pressure supplied thereto, said modulated hydraulic pressure substantially differing according as a hydraulic pressure is supplied or not supplied to said boost pressure port; and a combination of two switchover valves having a delivery port for delivering the hydraulic pressure supplied to said clutch, said two switchover valves being adapted to be individually switched over to operate in combination so as to switch over a supply of hydraulic pressure to said delivery port between the line hydraulic pressure and the modulated hydraulic pressure or to drain said delivery port, and to switch over a supply of hydraulic pressure to said boost pressure port of said pressure regulation valve between the line hydraulic pressure and the modulated hydraulic pressure or to drain said boost pressure port.

The above-mentioned two switchover valves may be individually switched over to a first switched state thereof when they are electrically powered and switched over to a second switched state thereof by spring biasing when they are not electrically powered, and said two switchover valves are switched over by being selectively electrically powered so that a highest hydraulic pressure is available at said delivery port when both of said two switchover valves are electrically powered, no hydraulic pressure is available at said delivery port when both of said two switchover valves are not electrically powered, and a medium hydraulic pressure is available at said delivery port when only one of said two switchover valves is electrically powered.

A first one of said two switchover valves may be a spool type valve having a spool element, a first input port supplied with the modulated hydraulic pressure, a second input port supplied with the line hydraulic pressure, a first output port adapted to be selectively connected with either said first input port or said second input port according to a shifting of said spool element in a first direction thereof or a second direction thereof opposite to said first direction, a drain port, and a second output port adapted to be selectively connected with either said drain port or said first input port according to the same shifting of said spool element, and a second one of said two switchover valves may be a spool type valve having a spool element, a first input port connected with said first output port of said first switchover valve, a second input port connected with said second output port of said first switchover valve, a first output port providing said delivery port and adapted to be selectively connected with either said first input port thereof or said second input port thereof according to a shifting of said spool element thereof in a first direction thereof or a second direction thereof opposite to said first direction, a drain port, and a second output port connected with said boost pressure port of said pressure regulation valve and adapted to be selectively connected with either said drain port thereof or said first input port thereof according to the same shifting of said spool element thereof.

The hydraulic pressure control device may further comprise a first hydraulic line for supplying the line hydraulic pressure therethrough, a first throttle for throttling an intermediate point of said first hydraulic line, and a first electromagnetic valve for selectively draining an intermediate point of said first hydraulic line at a downstream side of said first throttle, a second hydraulic line for supplying the line hydraulic pressure therethrough, a second throttle for throttling an intermediate point of said second hydraulic line, and a second electromagnetic valve for selectively draining an intermediate point of said second hydraulic line at a downstream side of said second throttle, wherein said first switchover valve further has a pilot port supplied with the hydraulic pressure through said first hydraulic line and applying the hydraulic pressure supplied thereto at one end of said spool element thereof, and a spring for biasing said spool element thereof against the hydraulic pressure applied to said one end thereof, and said second switchover valve further has a pilot port supplied with the hydraulic pressure through said second hydraulic line and applying the hydraulic pressure supplied thereto at one end of said spool element thereof, and a spring for biasing said spool element thereof against the hydraulic pressure applied to said one end thereof.

The above-mentioned first switchover valve is shifted in said first direction thereof when and only when the hydraulic pressure is supplied to said pilot port thereof, said second switchover valve is shifted in said second direction thereof when and only when the hydraulic pressure is supplied to said pilot port thereof, said first electromagnetic valve drains said intermediate point of said first hydraulic line when and only when it is supplied with electric energy, and said second electromagnetic valve drains said intermediate point of said second hydraulic line when and only when it is supplied with electric energy.

According to the above construction, the hydraulic pressure supplied to the clutch for controlling drive torque distribution in the four wheel drive device is changed quickly in a stepwise fashion by the switchover operation of the two switchover valves so that the four wheel drive device can be quickly switched over between the complete four wheel operation and the complete two wheel operation, including one or more intermediate half clutched incomplete four wheel operations.

Further, since the hydraulic pressure is controlled more accurately than by the duty factor control, the four wheel drive device may be controlled without depending upon the feedback control. Therefore no additional sensor is required, and the operational reliability of the four wheel drive device is much improved with lower cost benefits.

When the switching over of the two switchover valves is so arranged that no hydraulic pressure is available at the delivery port when both of the two switchover valves are not electrically powered, it is avoided that the engine is undesirably overloaded or the four wheel drive device is unduly damaged by a long time driving of the vehicle under the failure of the sound operation of the control system for the drive torque distribution control clutch.

BRIEF DESCRIPTION OF THE DRAWINGS

In the accompanying drawings.

DESCRIPTION OF THE PREFERRED EMBODIMENT

The present invention will now be described in detail with respect to a preferred embodiment with reference to the accompanying drawings.

Figure 1:
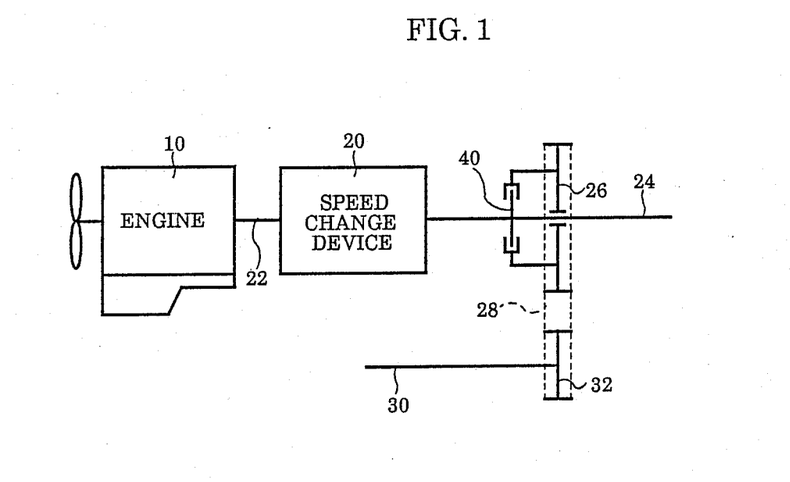
FIG. 1 is a schematic illustration of the so-called part-time type four wheel drive device incorporating a two wheel drive/four wheel drive switchover clutch.

Referring to FIG. 1 showing an example of the so-called part-time type four wheel drive device which incorporates the drive torque distribution control clutch to be controlled by the hydraulic pressure control device according to the present invention, an internal combustion engine 10 is drivingly connected with a speed change device 20 via a shaft member 22. The speed change device 20 may be a conventional speed change device for a vehicle, and directly drives a rear wheel drive shaft 24. A front wheel drive gearwheel 26 is freely rotatably supported on the rear wheel drive shaft 24, and is drivingly coupled with a front wheel drive gearwheel 32 connected with a front wheel drive shaft 30 via an endless chain 28.

A two wheel/four wheel drive switchover clutch 40 is provided between the rear wheel output shaft 24 and the front wheel drive gearwheel 26. When the switchover clutch 40 is engaged, both the rear wheel drive shaft 24 and the front drive shaft 26 are driven by the engine through the speed change device 20, and when the switchover clutch 40 is disengaged, the rear wheel drive shaft 24 only is driven.

The switchover clutch 40 is a hydraulically operable clutch which itself is well known in the art, and is engaged by a hydraulic pressure being supplied to its hydraulic servo chamber so that the degree of engagement is increased as the hydraulic pressure supplied thereto increases.

Figure 2:
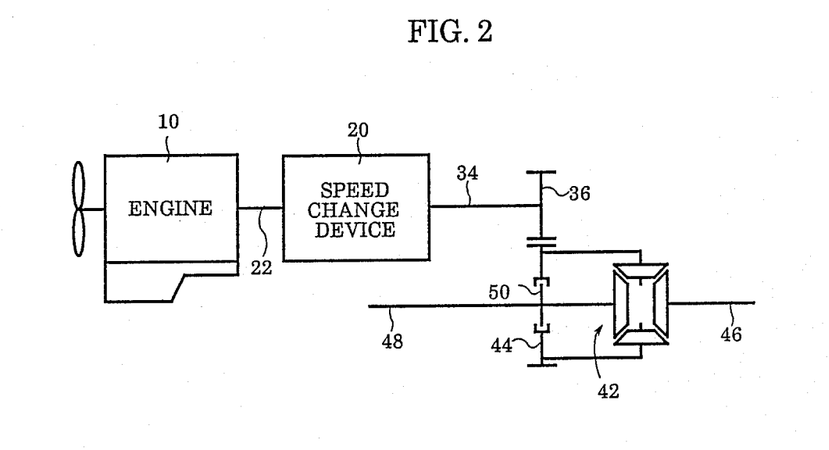
FIG. 2 is a schematic illustration of the so-called full-time type four wheel drive device incorporating a center differential device and a center differential lock-up clutch.

FIG. 2 shows an example of the so-called full-time type four wheel drive device incorporating the drive torque distribution control clutch to be controlled by the hydraulic pressure control device according to the present invention. The speed change device 20 drives, via an output shaft 34, an output gearwheel 36 which is meshing with an input gearwheel 44 of a center differential device 42. The center differential device 42 is a conventional bevel gear type differential device, and has a rear wheel drive shaft 46 on one side thereof and a front wheel drive shaft 48 on the other side thereof.

A differential lock-up clutch 50 is provided between the input gearwheel 44 and the front wheel drive shaft 48. The differential lock-up clutch 50 is also a hydraulically operable clutch which itself is well known in the art, and is engaged by a hydraulic pressure being supplied to its hydraulic servo chamber so that the degree of engagement is increased as the hydraulic pressure supplied thereto increases.

FIGS. 3 to 6 show an embodiment of the hydraulic pressure control device according to the present invention for controlling the drive torque distribution control clutch like the switchover clutch 40 or the central differential lock-up clutch 50 in four different operating states thereof.

In these FIGS. 60, indicates a pressure regulation valve which has a stepped spool element 62, and the conventional line hydraulic pressure which increases according to increase of engine load is supplied through a line hydraulic pressure supply line 58 to an input port 64 of the valve 60. In the valve 60, the spool element 62 is placed under the forces acting upward in the figures by the hydraulic pressure supplied to a first boost port 66 which is constantly supplied with the line pressure and a second boost port 68 which is selectively supplied with the line pressure as described hereinunder and the forces acting downward in the figures by the hydraulic pressure supplied to a feedback port 70 and a compression coil spring 72, and according to the balance between these upward and downward forces the spool element 62 controls the degree of connection between the input port 64 and an output port 74 and the degree of connection between the input port 64 and a drain port 65. Thus, a regulated hydraulic pressure is produced at the output port 74 as modified from the line hydraulic pressure supplied to the input port 64 according to the balance of the forces applied to the spool element 62. The feedback port 70 is connected with the output port 74 by a hydraulic line 76 having a throttle 78 at an intermediate point thereof, and is supplied with the regulated hydraulic pressure from the output port 74.

Figure 7:
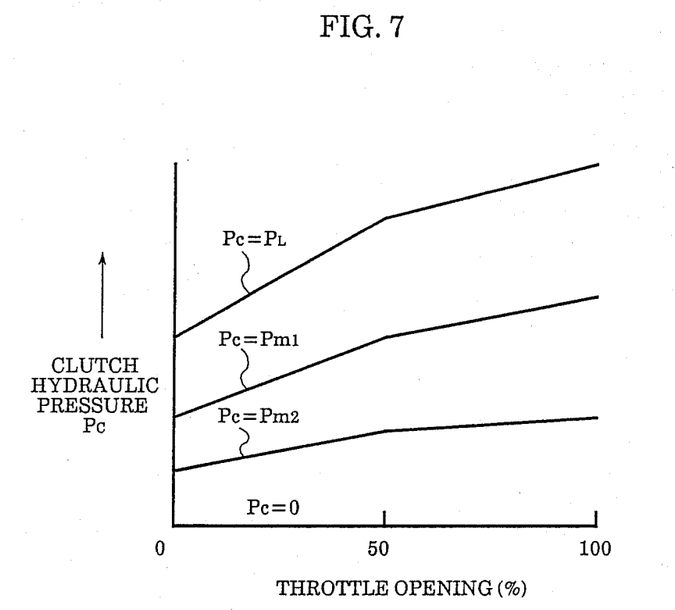
FIG. 7 is a graph showing the performance of the hydraulic pressure control device according to the present invention.

The pressure regulation valve 60 produces at the output port 74 a modulated hydraulic pressure Pm2 having a characteristic as shown in FIG. 7 when the line hydraulic pressure is supplied only to the first boost port 66, and when the line hydraulic pressure is supplied to the second boost port 68 in addition to the first boost port 66, a modulated hydraulic pressure Pm1 higher than Pm2, as shown in FIG. 7, for the same throttle opening.

Figure 3:
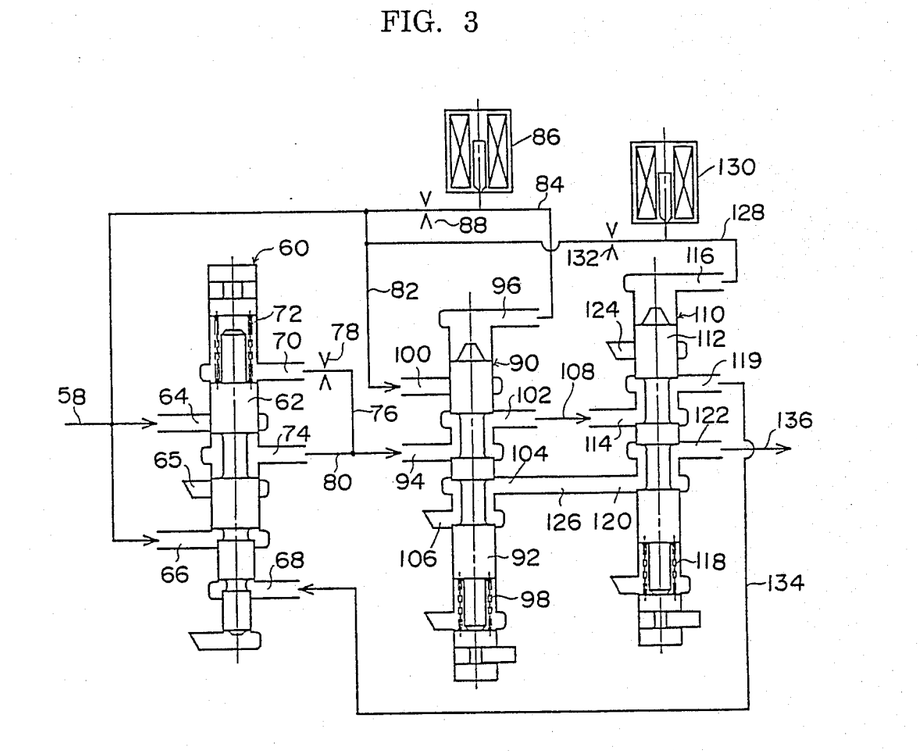
FIGS. 3 to 6 are hydraulic circuit diagrams showing an embodiment of the hydraulic pressure control device according to the present invention in four different operating states.
Figure 4:
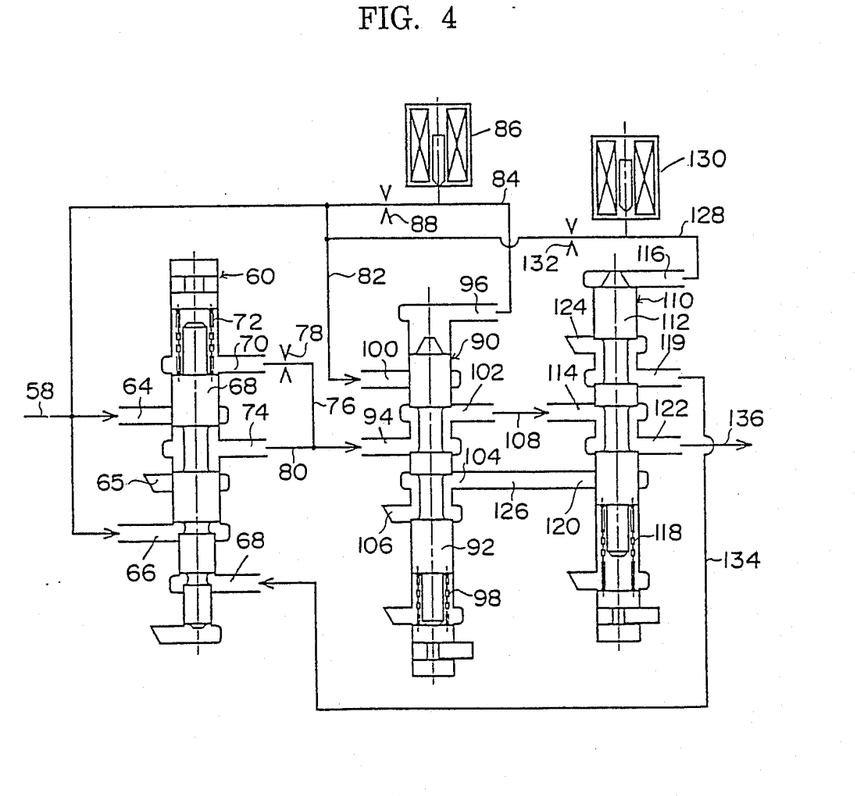
Figure 5:
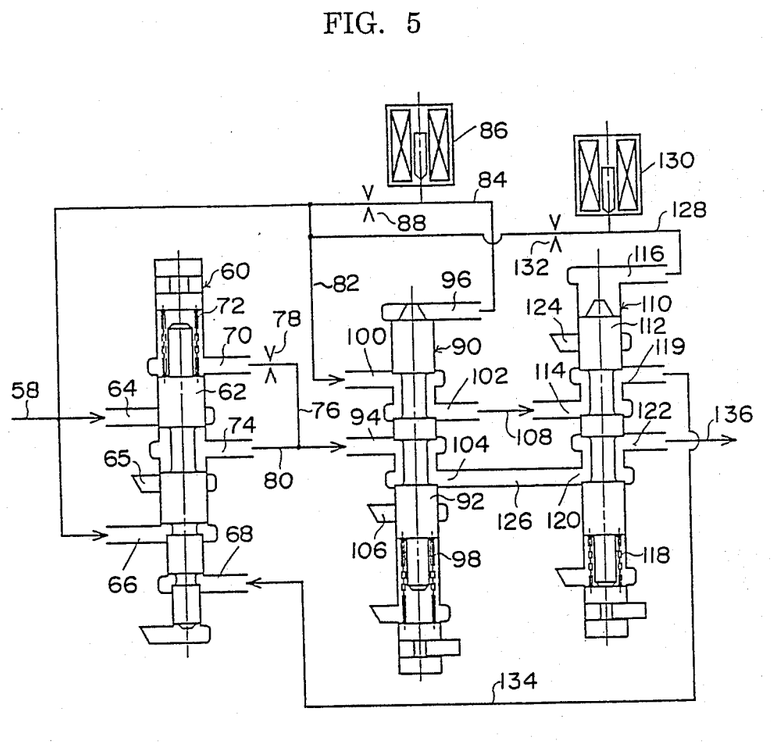
Figure 6:
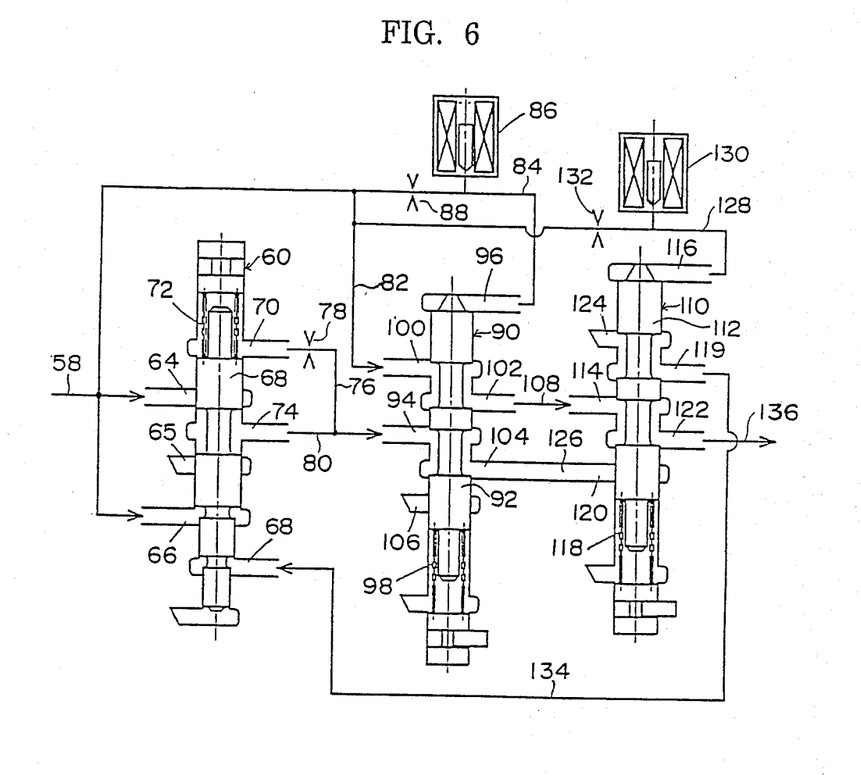

The output port 74 of the pressure regulation valve 60 is connected via a hydraulic line 80 with an input port 94 of a first switchover valve 90. The first switchover valve 90 is a spool type switching over valve having a spool element 92, and when a hydraulic pressure is supplied to a pilot port 96, as shown in FIG. 3 and FIG. 4, the spool element 92 moves downward as viewed in the figures to a lower position against the spring force of a compression coil spring 98, and thereby another input port 100 is closed, while the input port 94 is connected with an output port 102, and an output port 104 is connected with a drain port 106. However, when the hydraulic pressure is not supplied to the pilot port 96, the spool element 92 is moved upward as shown in FIG. 5 and FIG. 6 to a higher position by the spring force of the compression coil spring 98, and thereby the output port 102 is connected with the input port 100 in place of the input port 94, and the output port 104 is connected with the input port 94 in place of the drain port 106.

The line hydraulic pressure is directly supplied to the input port 100 through a hydraulic line 82, and the line hydraulic pressure is selectively supplied to the pilot port 96 through a hydraulic line 84 according to the opening or closing of an electromagnetic valve 86 provided at an intermediate point therealong. A throttle 88 is also provided at an intermediate point of the hydraulic line 84 upstream of the electromagnetic valve 86 along the flow of the hydraulic fluid therein. Therefore, when the electromagnetic valve 86 is not energized so as not to open its port for draining an intermediate point of the line 84, the line hydraulic pressure is supplied through the hydraulic line 84 to the pilot port 96, whereas when the electromagnetic valve 86 is energized so as to open said drain port, the line hydraulic pressure is drained therethrough and no substantial hydraulic pressure is supplied to the pilot port 96.

The output port 102 of the first switchover valve 90 is connected via a hydraulic line 108 with an input port 114 of the second switchover valve 110. The second switchover valve 90 is also a spool type switchover valve having a spool element 112, and when a hydraulic pressure is supplied to a pilot port 116, the spool element 112 moves downward as shown in FIG. 3 and FIG. 5 to a lower position against the spring force of a compression coil spring 118, and thereby the input port 114 is connected with an output port 119, and another input port 120 is connected with another output port 122, whereas when the hydraulic pressure is not supplied to the pilot port 116 the spool element 112 is moved upward as shown in FIG. 4 and FIG. 6 to a higher position by the spring force of the compression coil spring 118, and thereby the output port 119 is connected with a drain port 124 in place of the input port 114, and the output port 122 is connected with the input port 114 in place of the input port 120. The input port 120 is connected via a hydraulic line 126 with the output port 104 of the first switchover valve 90. The line hydraulic pressure is selectively supplied through a hydraulic line 128 to the pilot port 116 according to the opening or closing of an electromagnetic valve 130 provided at an intermediate point therealong. A throttle 132 is also provided at an intermediate point of the hydraulic line 128 upstream of the electromagnetic valve 130 as view along the flow of the hydraulic fluid therein. Therefore, when the electromagnetic valve 130 is not energized so as not to open its port for draining an intermediate point of the line 128, the line hydraulic pressure is supplied through the hydraulic line 128 to the pilot port 116, whereas when the electromagnetic valve 130 is energized to open said drain port, the line hydraulic pressure is drained therethrough and no substantial hydraulic pressure is supplied to the pilot port 116.

The output port 119 of the second switchover valve 110 is connected with the second boost port 68 of the pressure regulation valve 60 via a hydraulic line 134. The output port 122 is connected via a hydraulic line 136 with the hydraulic servo chamber not shown in the drawing of the switchover clutch 40 or the central differential lock-up clutch 50.

The hydraulic pressure control device of the above described construction operates as follows:

The two electromagnetic valves 86 and 130 are individually energized or deenergized by an electronic control means not shown in the drawing. When neither of the electromagnetic valves 86 and 130 is energized so that the drain ports controlled by these two electromagnetic valves 86 and 130 are both closed, then as shown in FIG. 3 the spool element 92 of the first switchover valve 90 and the spool element 112 of the second switchover valve 110 are both in the lower position. At this time the output port 122 of the second switchover valve 110 is connected with the output port 104 of the first switchover valve 90 through the input port 120 and the hydraulic line 126, and the output port 104 is connected to the drain port 106, and thereby the hydraulic pressure supplied to the hydraulic servo chamber of the switchover clutch 40 or the central differential lock-up clutch 50 is drained, and thus Pc=0, as shown in FIG. 7.

When the electromagnetic valve 130 only is energized, so that the spool element 92 of the first switchover valve 90 is in the lower position but the spool element 112 of the second switchover valve 110 is in the upper position, as shown in FIG. 4, the output port 122 is connected with the output port 74 of the pressure regulation valve 60 through the input port 114, the hydraulic line 108, the output port 102 and input port 94 of the first switchover valve 90 and the hydraulic line 80, and is supplied with the modulated hydraulic pressure produced at the output port 74 of the pressure regulation valve 60. Since the second boost port 68 of the pressure regulation valve 60 is connected through the hydraulic line 134, and the output port 119 of the second switchover valve 110 to the drain port 124, no hydraulic pressure is supplied to the second boost port 68 of the pressure regulation valve 60, and the hydraulic pressure is supplied to the first boost port 66 only. Therefore, at this time the output hydraulic pressure of the pressure regulation valve 60, i.e. the modulated hydraulic pressure, is of a relatively lower value as the pressure Pm2 in FIG. 7, and this modulated hydraulic pressure Pm2 is supplied to said hydraulic servo chamber as the clutch operating hydraulic pressure Pc.

When the electromagnetic valve 86 only is energized, then as shown in FIG. 5 the spool element 92 of the first switchover valve 90 is in the upper position, while the spool element 112 of the second switchover valve 110 is in the lower position. At this time the output port 122 of the second switchover valve 110 is connected with the output port 74 of the pressure regulation valve 60 through the input port 120, the hydraulic line 126, the output port 104 and input port 94 of the first switchover valve 90 and the hydraulic line 80, and is supplied with the modulated hydraulic pressure produced at the output port 74. The second boost port 68 of the pressure regulation valve 60 is connected through the hydraulic line 134, the output port 119 and the input port 114 of the second switchover valve 110, the hydraulic line 108, and the output port 102 and the input port 100 of the first switchover valve 90 with the hydraulic line 82, and thereby the line hydraulic pressure is supplied to the second boost port 68. At this time a relatively higher modulated hydraulic pressure as indicated by Pm1 in FIG. 7 is produced at the output port 74 of the pressure regulation valve 60, and this higher modulated hydraulic pressure Pm1 is supplied to said hydraulic servo chamber as the clutch operating hydraulic pressure Pc.

When both of the electromagnetic valves 86 and 130 are energized, then as shown in FIG. 6 the spool element 92 of the first switchover valve 90 and the spool element 112 of the second switchover valve 110 are both in the upper position. At this time the output port 122 is connected through the input port 114, the output port 102 and the input port 100 of the first switchover valve 90 with the hydraulic line 108, and, and thereby the line hydraulic pressure PL is directly supplied to the output port 122 as the clutch hydraulic pressure Pc.

Although the present invention has been described in detail with reference to a particular embodiment thereof, it will be noted by those skilled in the art that various modifications are possible with respect to the embodiment without departing from the spirit of the invention.

What is claimed is:

1. A hydraulic pressure control device for a clutch for controlling drive torque distribution in a four wheel drive device, said clutch varying torque transmission capacity thereof according to a hydraulic pressure supplied thereto so as thereby to vary the drive torque distribution in the four wheel drive device, comprising:

a pressure regulation valve having at least one boost pressure port and producing a modulated hydraulic pressure from a line hydraulic pressure supplied thereto, said modulated hydraulic pressure substantially differing according as a hydraulic pressure is supplied or not supplied to said boost pressure port; and a combination of two switchover valves having a delivery port for delivering the hydraulic pressure supplied to said clutch, said two switchover valves being adapted to be individually switched over to operate in combination so as to switch over a supply of hydraulic pressure to said delivery port between the line hydraulic pressure and the modulated hydraulic pressure or to drain said delivery port, and to switch over a supply of hydraulic pressure to said boost pressure port of said pressure regulation valve between the line hydraulic pressure and the modulated hydraulic pressure or to drain said boost pressure port.

2. A hydraulic pressure control device according to claim 1, wherein said two switchover valves are individually switched over to a first switched state thereof when they are electrically powered and switched over to a second switched state thereof by spring biasing when they are not electrically powered, and said two switchover valves are switched over by being selectively electrically powered so that a highest hydraulic pressure is available at said delivery port when both of said two switchover valves are electrically powered, no hydraulic pressure is available at said delivery port when both of said two switchover valves are not electrically powered, and a medium hydraulic pressure is available at said delivery port when only one of said two switchover valves is electrically powered.

3. A hydraulic pressure control device according to claim 1, wherein a first one of said two switchover valves is a spool type valve (90) having a spool element (92), a first input port (94) supplied with the modulated hydraulic pressure, a second input port (100) supplied with the line hydraulic pressure, a first output port (102) adapted to be selectively connected with either said first input port or said second input port according to a shifting of said spool element in a first direction thereof or a second direction thereof opposite to said first direction, a drain port (106), and a second output port (104) adapted to be selectively connected with either said drain port or said first input port according to the same shifting of said spool element, and a second one of said two switchover valves is a spool type valve (110) having a spool element (112), a first input port (114) connected with said first output port of said first switchover valve, a second input port (120) connected with said second output port of said first switchover valve, a first output port (122) providing said delivery port and adapted to be selectively connected with either said first input port thereof or said second input port thereof according to a shifting of said spool element thereof in a first direction thereof or a second direction thereof opposite to said first direction, a drain port (124), and a second output port (119) connected with said boost pressure port (68) of said pressure regulation valve (60) and adapted to be selectively connected with either said drain port thereof or said first input port thereof according to the same shifting of said spool element thereof.

4. A hydraulic pressure control device according to claim 3, further comprising a first hydraulic line (84) for supplying the line hydraulic pressure therethrough, a first throttle (88) for throttling an intermediate point of said first hydraulic line, and a first electromagnetic valve (86) for selectively draining an intermediate point of said first hydraulic line at a downstream side of said first throttle, a second hydraulic line (128) for supplying the line hydraulic pressure therethrough, a second throttle (132) for throttling an intermediate point of said second hydraulic line, and a second electromagnetic valve (130) for selectively draining an intermediate point of said second hydraulic line at a downstream side of said second throttle, wherein said first switchover valve further has a pilot port (96) supplied with the hydraulic pressure through said first hydraulic line and applying the hydraulic pressure supplied thereto at one end of said spool element thereof, and a spring (98) for biasing said spool element thereof against the hydraulic pressure applied to said one end thereof, and said second switchover valve further has a pilot port (116) supplied with the hydraulic pressure through said second hydraulic line and applying the hydraulic pressure supplied thereto at one end of said spool element thereof, and a spring (118) for biasing said spool element thereof against the hydraulic pressure applied to said one end thereof.

5. A hydraulic pressure control device according to claim 4, wherein said first switchover valve is shifted in said first direction thereof when and only when the hydraulic pressure is supplied to said pilot port thereof, said second switchover valve is shifted in said second direction thereof when and only when the hydraulic pressure is supplied to said pilot port thereof, said first electromagnetic valve drains said intermediate point of said first hydraulic line when and only when it is supplied with electric energy, and said second electromagnetic valve drains said intermediate point of said second hydraulic line when and only when it is supplied with electric energy.

* * * * *